United States Patent
Rupp et al.

(10) Patent No.: US 11,988,605 B2
(45) Date of Patent: May 21, 2024

(54) FILTER DEVICE FOR AN OPTICAL MODULE FOR A LAB-ON-A-CHIP ANALYSIS DEVICE, OPTICAL MODULE FOR A LAB-ON-A-CHIP ANALYSIS DEVICE AND METHOD FOR OPERATING AN OPTICAL MODULE FOR A LAB-ON-A-CHIP ANALYSIS DEVICE

(71) Applicant: Robert Bosch GmbH, Stuttgart (DE)

(72) Inventors: Jochen Rupp, Stuttgart (DE); Robert Schreiner, Stephanskirchen (DE); Karsten Seidl, Mülheim an der Ruhr (DE); Tino Frank, Lucerne (CH); Genrich Siris, Taufkirchen (DE)

(73) Assignee: Robert Bosch GmbH, Stuttgart (DE)

( * ) Notice: Subject to any disclaimer, the term of this patent is extended or adjusted under 35 U.S.C. 154(b) by 342 days.

(21) Appl. No.: 17/286,339

(22) PCT Filed: Oct. 18, 2019

(86) PCT No.: PCT/EP2019/078348
§ 371 (c)(1),
(2) Date: Sep. 27, 2021

(87) PCT Pub. No.: WO2020/083768
PCT Pub. Date: Apr. 30, 2020

(65) Prior Publication Data
US 2022/0252513 A1  Aug. 11, 2022

(30) Foreign Application Priority Data
Oct. 22, 2018  (DE) .................... 10 2018 218 046.6

(51) Int. Cl.
*G01N 21/64*  (2006.01)
*G02B 7/00*   (2021.01)
*G02B 26/00*  (2006.01)

(52) U.S. Cl.
CPC ....... *G01N 21/645* (2013.01); *G01N 21/6428* (2013.01); *G02B 7/006* (2013.01); *G02B 26/008* (2013.01); *G01N 2021/6471* (2013.01)

(58) Field of Classification Search
None
See application file for complete search history.

(56) References Cited

U.S. PATENT DOCUMENTS

| | | |
|---|---|---|
| 3,909,609 A | 9/1975 | Kidd et al. |
| 4,896,185 A | 1/1990 | Okuzawa |
| (Continued) | | |

FOREIGN PATENT DOCUMENTS

| | | |
|---|---|---|
| AU | 2016231537 A1 | 3/2017 |
| CN | 104105957 A | 10/2014 |
| (Continued) | | |

OTHER PUBLICATIONS

International Search Report corresponding to PCT Application No. PCT/EP2019/078348, dated May 4, 2020 (German and English language document) (9 pages).

(Continued)

*Primary Examiner* — Marcus H Taningco
(74) *Attorney, Agent, or Firm* — Maginot, Moore & Beck LLP

(57) ABSTRACT

A filter device for an optical module for a lab-on-a-chip analysis device, in which the optical module has a light path, includes a support element, a filter support, and a drive device. The support element can be mounted in the optical module. The filter support is arranged so that it can move on the support element. The filter support also has a first filter region and a second filter region. The drive device is configured such that the filter support can move between a first position in which the first filter region is arranged in the (Continued)

light path, and a second position in which the second filter region is arranged in the light path.

14 Claims, 7 Drawing Sheets

(56) References Cited

U.S. PATENT DOCUMENTS

| | | | | |
|---|---|---|---|---|
| 2006/0006067 | A1* | 1/2006 | Unger | G01N 21/8483 |
| | | | | 204/603 |
| 2013/0083315 | A1* | 4/2013 | Lo | G01J 3/46 |
| | | | | 356/402 |
| 2014/0273194 | A1* | 9/2014 | Handique | G01N 21/76 |
| | | | | 250/216 |
| 2018/0264464 | A1 | 9/2018 | Greef et al. | |
| 2018/0288292 | A1 | 10/2018 | Moggridge et al. | |

FOREIGN PATENT DOCUMENTS

| | | |
|---|---|---|
| CN | 106901683 A | 6/2017 |
| DE | 36 37 662 A1 | 5/1987 |
| DE | 40 35 690 A1 | 5/1992 |
| DE | 198 35 070 A1 | 2/2000 |
| EP | 1 279 946 A2 | 1/2003 |
| JP | S61-237026 A | 10/1986 |
| JP | H4-6502 A | 1/1992 |
| JP | H10-170429 A | 6/1998 |
| JP | H11-94742 A | 4/1999 |
| JP | 2000-56228 A | 2/2000 |
| JP | 2003-21784 A | 1/2003 |
| JP | 2003-98330 A | 4/2003 |
| JP | 2004-6502 A | 1/2004 |
| JP | 2007-135989 A | 6/2007 |
| JP | 2012-522450 A | 9/2012 |
| JP | 2015-14755 A | 1/2015 |
| JP | 2017-11459 A | 1/2017 |
| KR | 10-2012-0125745 A | 11/2012 |
| WO | 98/07022 A1 | 2/1998 |
| WO | 2004/031825 A1 | 4/2004 |
| WO | 2007/028519 A1 | 3/2007 |
| WO | 2012/178166 A1 | 12/2012 |

OTHER PUBLICATIONS

Gerver, R. E. et al., "Programmable microfluidic synthesis of spectrally encoded microspheres," Lab Chip, 2012, vol. 12, No. 22, pp. 4716-4723 (8 pages), Sep. 25, 2012, The Royal Society of Chemistry.

* cited by examiner

FILTER DEVICE FOR AN OPTICAL MODULE FOR A LAB-ON-A-CHIP ANALYSIS DEVICE, OPTICAL MODULE FOR A LAB-ON-A-CHIP ANALYSIS DEVICE AND METHOD FOR OPERATING AN OPTICAL MODULE FOR A LAB-ON-A-CHIP ANALYSIS DEVICE

This application is a 35 U.S.C. § 371 National Stage Application of PCT/EP2019/078348, filed on Oct. 18, 2019, which claims the benefit of priority to Serial No. DE 10 2018 218 046.6, filed on Oct. 22, 2018 in Germany, the disclosures of which are incorporated herein by reference in their entirety.

BACKGROUND

The disclosure is directed to a filter device, an optical module, and a method for operating an optical module as disclosed herein.

In-vitro diagnostics (IVD) is a field of medical products which measures specific variables from human samples, such as a concentration of a molecule, a presence of a specific DNA sequence, or a composition of blood, to permit a diagnosis and treatment decision. This can take place in a chain of multiple laboratory steps, wherein the sample can be prepared so that the target variable is measurable without interference. Various laboratory methods each having a device suitable for the method can be applied. In analysis devices for laboratory diagnostics close to the patient, so-called point-of-care devices, such in-vitro diagnostic tests can be represented in a device in order to reduce the number of manual steps by the user. The sample can be introduced into a disposable cartridge. After the cartridge is introduced into the analysis device, the diagnostic test can be executed fully automatically. The analysis device can include optical or optomechanical elements to carry out fluorescence-based detection methods.

SUMMARY

Against this background, the approach presented here presents a filter device for an optical module for a lab-on-a-chip analysis device, an optical module for lab-on-a-chip analysis device, and a method for operating an optical module for a lab-on-a-chip analysis device.

The filter device can advantageously be used as an optomechanical device for a lab-on-a-chip analysis device. An electrically driven filter carrier of the filter device enables a rapid filter change, which is advantageous with respect to diagnostic methods. The structure of the filter device enables an implementation of various optical detection methods, which is advantageous for versatile usage options of the lab-on-a-chip analysis device. The filter device moreover advantageously enables a particularly compact design.

A filter device for an optical module for a lab-on-a-chip analysis device is presented. The optical module includes a light path. The filter device comprises a carrier element, a filter carrier, and a drive unit. The carrier element is arrangeable in the optical module. The filter carrier is movably arranged on the carrier element. Moreover, the filter carrier includes a first filter region and a second filter region. The drive unit is designed to move the filter carrier between a first position, in which the first filter region is arranged in the light path, and a second position, in which the second filter region is arranged in the light path.

The lab-on-a-chip analysis device can be a device for carrying out a diagnostic method in which a lab-on-a-chip cartridge is analyzed, which can also be referred to as a lab-on-a-chip or microfluidic system. The optical module can be used for optical diagnostics, for example to observe an amplification of DNA by means of a fluorescence measurement after each polymerase chain reaction cycle, or for another fluorescence-based detection method such as the melting curve analysis. The light path of the optical module can be an excitation light path or a detection light path. The excitation light path can lead from a light source to the lab-on-a-chip cartridge. The detection light path can lead from the lab-on-a-chip cartridge to an image sensor. The filter device can be used to filter the light following the light path. Different filter regions of the filter device can advantageously be positioned in chronological succession in the light path. Different wavelengths of the light can thus be filtered out or let through in chronological succession. Two different filters, for example a color filter and a black filter, are arrangeable on the first and second filter region of the filter carrier. No filter can also be arranged on one of the filter regions, so that an empty position is implemented. In the case of a color filter, at least one wavelength range of the light can be filtered out at the corresponding filter region. In the case of a black filter, the light can be completely absorbed at the corresponding filter region. In the case of an empty position, the light can pass the corresponding filter region unfiltered. The drive unit can be electrical, for example, and can be designed to change positions of the filter regions. For this purpose, the drive unit can, for example, linearly displace or rotate the filter carrier to assume the first and the second position, in order to arrange one or more of the filter regions in a light path.

According to one embodiment, the first filter region can be formed as an optical filter or as an empty position. Additionally or alternatively, the second filter region can be formed as an optical filter or as an empty position.

Moreover, the filter carrier can also include further filter regions, which can also be formed as an optical filter or empty position. The formation of an empty position is advantageous to enable a chemoluminescence detection.

According to one embodiment, the drive unit can be embodied as a belt drive having a toothed belt and an electric motor. The electric motor can be embodied, for example, as a stepping motor. To move the filter carrier, the toothed belt can be connected, for example, to a drive roller, which is driven by the electric motor. Tensioning rollers can be used for a taut line of the toothed belt. It is possible to change the position of the filter regions and thus to change the filter particularly quickly by way of such a drive of the filter carrier, for example in a time of less than half of a second.

According to one embodiment, the filter device can also include a sensor which is designed to provide a sensor signal representing a positioning of the filter carrier.

The sensor can be embodied, for example, as a Hall sensor or as a photoelectric sensor. A photoelectric sensor can implement a transmitted light method or incident light method known in metrology. The sensor can be designed to detect the position of the filter regions of the filter carrier or a movement of the filter carrier. This advantageously enables exact monitoring of the position of the filter carrier and thus the filter regions and of filters arranged in the filter regions. The sensor signal can be used, for example, to control the drive unit, the light source, and/or the image sensor.

According to one embodiment, the filter carrier can be embodied as a linearly movable filter slide or as a rotatable filter wheel. The embodiment as a linearly movable filter slide, also called a slider, advantageously enables minimized travel distances of the filter carrier during the movement of the filter carrier in relation to the carrier element in order to set the position of the filter regions. The embodiment as a filter wheel is advantageous, for example, if the filter device is arranged in an excitation light path for fluorescence excitation.

If the filter carrier is embodied as a linearly movable filter slide, the filter device can include a further filter slide. The further filter slide can be movably arranged on the carrier element. Moreover, the further filter slide can include a further first filter region and a further second filter region. The drive unit can be designed to move the further filter slide between a further first position, in which the further first filter region is arranged in the light path, and a further second position, in which the further second filter region is arranged in the light path. The filter slide and the further filter slide can be arranged partially overlapping, which is advantageous with respect to a compact construction.

The optical module for the lab-on-a-chip analysis device can include a further light path. According to one embodiment, in this case, in the first position of the filter slide, the first filter region can be arranged in the light path and the second filter region can be arranged in the further light path. Additionally or alternatively, in the further first position of the further filter slide, the further first filter region can be arranged in the light path and the further second filter region can be arranged in the further light path. Moreover, depending on the arrangement of the filter regions on the filter slide and the further filter slide, in the first position of the filter slide, the first filter region can be arranged in the light path and the second filter region can be arranged in the further light path or outside the light path and outside the further light path. Furthermore, in the second position of the filter slide, the second filter region can be arranged in the light path and the first filter region can be arranged in the further light path or outside the light paths. It is thus advantageously possible to optically influence multiple light paths separately.

According to one embodiment, the filter slide and the further filter slide can also be arranged one over another at least in sections and translationally displaceable in relation to one another. For this purpose, the filter slide and the further filter slide can be arranged sliding translationally on ball-bearing-mounted rails, for example. This arrangement is advantageous with respect to a rapid filter change of filters arranged on the filter regions and with respect to the smallest possible width of the filter device.

If the optical module includes a further light path, and the filter carrier is embodied as a filter wheel, according to one embodiment, the filter device can include a further filter wheel. The further filter wheel can be rotatably arranged on the carrier element. Moreover, the further filter wheel can include a further first filter region and a further second filter region. The drive unit can be designed to move the further filter wheel between a further first position, in which the further first filter region is arranged in the further light path, and a further second position, in which the further second filter region is arranged in the further light path. The embodiment of a further filter wheel is advantageous if the filter device is arranged in the excitation light path for fluorescence excitation, for example, if a cartridge having multiple chambers, which are excited separately, is accommodated in the optical module.

If the filter device comprises, according to one embodiment, the filter wheel and the further filter wheel, the filter wheels can thus be arranged adjacent to one another and can be synchronously rotatable. This embodiment enables a rapid and uniform filter change, which is advantageously simultaneous in the case of an optical excitation of multiple regions.

Moreover, this approach presents an optical module for a lab-on-a-chip analysis device. The optical module comprises a light source, a receptacle region for a lab-on-a-chip cartridge, an image sensor, an embodiment of a first filter device, and an embodiment of a second filter device. The first filter device is arranged in an excitation light path between the light source and the receptacle region. The second filter device is arranged in a detection light path between the receptacle region and the image sensor.

The optical module can be used, for example, for a fluorescence excitation in multiple fluorescence wavelength ranges in one or more regions or chambers of a lab-on-a-chip cartridge received in the receptacle region. Moreover, the optical module can be used for a fluorescence detection in multiple fluorescence wavelength ranges over an image region. It is advantageously possible to enable a rapid filter change in, for example, half of a second.

If a lab-on-a-chip cartridge is received in the receptacle region, the fluorescence excitation can be carried out by means of a white light-emitting diode as a light source. The light-emitting diode can be, for example, temperature stabilized and monitored in intensity by means of a check photodiode. An emitted light path can be referred to as an excitation light path. The excitation light path can be guided in the direction of the first filter device, the first filter device can comprise, for example, the filter carrier in the form of the filter wheel. The excitation light path can be guided by the first filter device to a region of the lab-on-a-chip cartridge to be excited and can reflect or fluoresce at the lab-on-a-chip cartridge. The emitted light can be guided as a detection path to the second filter device, which can comprise the filter slide as a filter carrier, for example. From there, the detection light path is guided in the direction of the image sensor. The image sensor can comprise, for example, a macro lens.

A method for operating an embodiment of the above-described optical module for a lab-on-a-chip analysis device is also presented. The method comprises a step of providing a first setting signal, a step of providing a second setting signal, a step of providing a first filter change signal, and a step of providing a second filter change signal. The first setting signal is designed to set the filter carrier of the first filter device in a position associated with an analysis mode. The position associated with the analysis mode can be, for example, the first position or the second position of the filter carrier. The second setting signal is designed to set the filter carrier of the second filter device in a position associated with the analysis mode. The first filter change signal is designed to set the filter carrier of the first filter device in a position associated with a further analysis mode. The second filter change signal is designed to set the filter carrier of the second filter device in a position associated with the further analysis mode. For example, the position of the filter carrier of the first filter device associated with the further analysis mode can correspond to the position of the filter carrier of the first filter device associated with the analysis mode, in this case the set position of the filter carrier is not changed.

BRIEF DESCRIPTION OF THE DRAWINGS

Exemplary embodiments of the approach presented here are illustrated in the drawings and explained in greater detail in the following description. In the figures.

DETAILED DESCRIPTION

In the following description of advantageous exemplary embodiments of the present disclosure, identical or similar reference signs are used for the elements illustrated in the various figures and acting similarly, wherein a repeated description of these elements is omitted.

Figure 1:
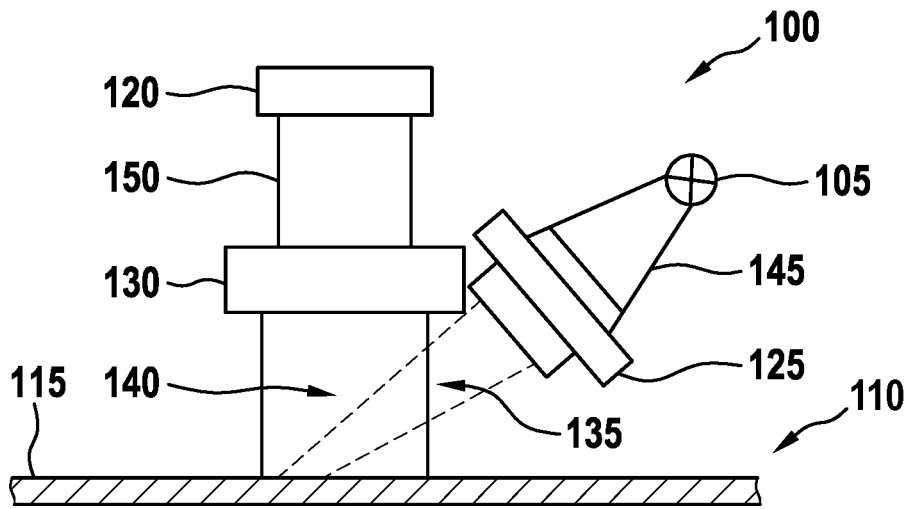
FIG. 1 shows a schematic illustration of an optical module for a lab-on-a-chip analysis device according to one exemplary embodiment.

FIG. 1 shows a schematic illustration of an optical module 100 for a lab-on-a-chip analysis device according to one exemplary embodiment. The optical module 100 comprises a light source 105, a receptacle region 110 for a lab-on-a-chip cartridge 115, an image sensor 120, a first filter device 125, and a second filter device 130. The first filter device 125 is arranged in an excitation light path 135 between the light source 105 and the receptacle region 110. The second filter device 130 is arranged in a detection light path 140 between the receptacle region 110 and the image sensor 120.

The optical module 100 can also be referred to as a fluorescence optical assembly or as an optofluidic analytics platform for in-vitro diagnostics. A lab-on-a-chip cartridge 115 is arranged by way of example in the receptacle region 110. The light source 105 is embodied, for example, as a white light-emitting diode. By means of a guiding cone 145 as a light guide, the light emitted by the light source 105 is guided to the first filter device 130, and then to an excitation region on the lab-on-a-chip cartridge 115. The lab-on-a-chip cartridge 115 includes a chamber having a reaction liquid. For example, a fluorescence excitation takes place in the reaction liquid in the chamber which corresponds to the excitation region. The emitted fluorescent light is then conducted along a detection light path 140 to the second filter device 130 and imaged by means of an optional macro lens 150 on the image sensor 120.

A color filter, which is designed to filter a corresponding detection wavelength, is optionally arranged in the second filter device 130. In this way, wavelengths to be detected can pass the filter device 130. The optical module can also include multiple light sources 105. The first filter device 125 and the second filter device 130 are formed accordingly in this case to filter or guide light of multiple light paths. For example, monochromatic filters are arranged on the filter devices 125, 130.

The image sensor 120 can be embodied, for example, as a CMOS detector, using which a larger recording field than the one or more light sources 105 can be covered. The optical module 100 shown here is usable for checks, initial tests, and various detection methods and also for various recording modes and combinations of various recording modes, which is described in greater detail on the basis of the following figures. It is thus advantageously possible to implement various detection methods in spite of a compact construction of the optical module 100. Due to the modular structure, the optical module 100 offers a high level of implementation variation with clearly defined design rules and interface specifications. Moreover, it is advantageously possible to implement feedback systems and dynamic step sequences. Depending on the structure of the optical module 100, for example having multiple light sources 105 and correspondingly formed filter devices 125, 130, it is moreover possible to run and record processes in parallel. For this purpose, for example, various check recordings are made in the same or another recording mode before the actual signal is measured. A check can thus be a spatially resolved image, while the actual measurement is an averaged value. In the case of irregularities, the detection mode can be changed to assess errors directly, as described on the basis of FIG. 13.

The optical module 100 shown here is usable in conjunction with the lab-on-a-chip analysis device for executing a measurement method such as a polymerase chain reaction (PCR), a fluorescence measurement, or a pH measurement, in particular for evaluating various biochemical diagnostic methods, which are fluidically processed and analyzed by means of a microfluidic system such as the lab-on-a-chip cartridge 115 shown here as an example, also referred to as a lab-on-a-chip. The optical module 100 is usable, for example, to carry out a quantitative PCR (qPCR) or also real-time qPCR, in which an amplification of the DNA is observed by means of a fluorescence measurement after each PCR cycle. DNA pigments are used to detect and quantify the PCR products. A further fluorescence-based method is the melting curve analysis, in which the DNA double strand is melted in the case of a DNA sequence of specific temperature. A fluorescent pigment is released and a change of the fluorescence signal is detectable. The temperature is passed through in steps of tenths of a degree in the range, for example, between 20-95° C. and the fluorescence is to be measured after each temperature step or during the temperature increase. Due to the use of various pigments, multiplex tests are enabled for detecting various DNA sequences (both in the case of qPCR and also melting curve or other fluorescence-based detection methods). By means of the optical module 100 shown here, it is advantageously possible to read out the fluorescence of various pigments in a short time, for example within a few seconds, in a very small installation space.

The arrangement of optical filter elements on the filter devices 125, 130 in the excitation light path 135 and detection light path 145 of a fluorescence optical unit and the formation of the filter devices 125, 130, which is described in greater detail on the basis of the following FIGS. 2 to 5, advantageously enable filter change times between two filter elements of an average of half of a second to be achieved, so that cycle times of less than six and a half seconds are possible for four colors including the image recording times of the image sensor 120. The fluorescence detection is carried out by means of the image sensor 120, for example, over a large detection region of greater than 20 by 20 mm². Depending on the structure of the optical module, the fluorescence excitation potentially takes place here in multiple chambers of the lab-on-a-chip cartridge 115, each having a diameter of at least 2 mm. A width of the optical module 100 is, for example, less than 200 mm. A continued image analysis of the recorded fluorescent image is carried out, for example, by image processing algorithms. A recognition of a reagent chamber for position recognition of the chamber within the image and/or a liquid level recognition and analysis can be carried out.

Figure 2:
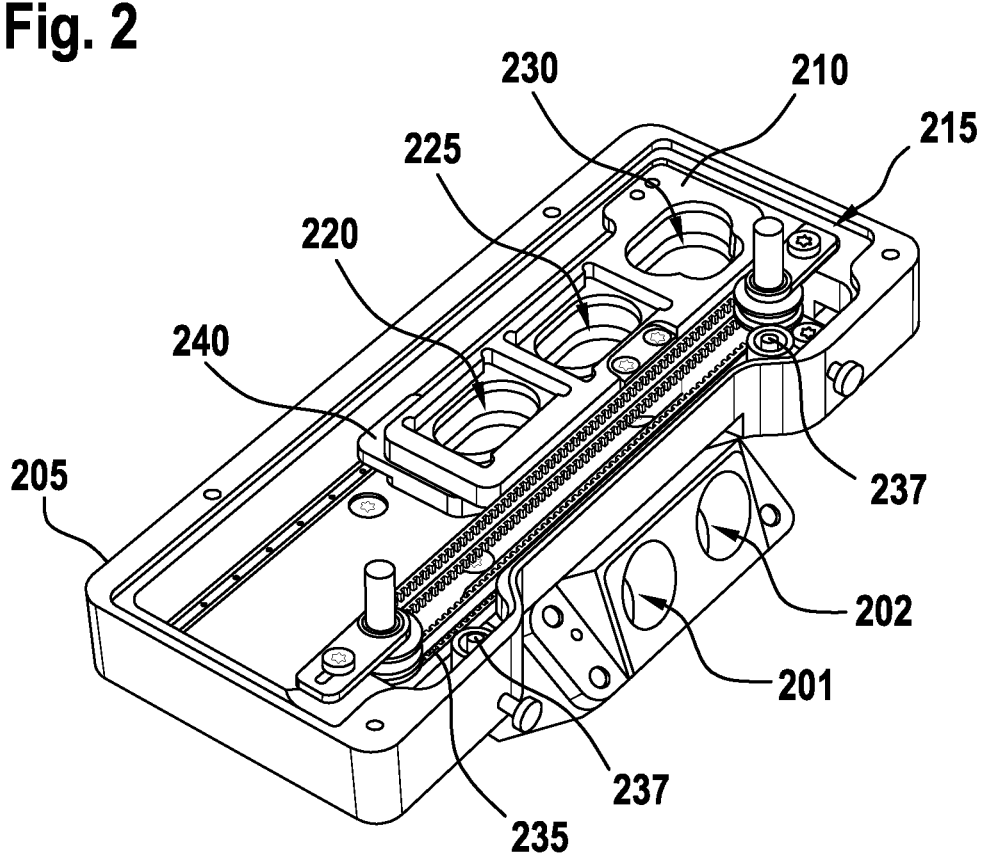
FIGS. 2 to 4 each show a schematic illustration of a filter device for an optical module for a lab-on-a-chip analysis device according to one exemplary embodiment.

FIG. 2 shows a schematic illustration of a filter device 130 for an optical module for a lab-on-a-chip analysis device according to one exemplary embodiment. The filter device 130 shown here is similar or corresponds to the second filter device described on the basis of FIG. 1.

The optical module includes at least one light path. According to the exemplary embodiment shown, the filter device 130 includes a through opening 201 for a light path and an optional further through opening 202 for a further light path. For example, the filter device 130 has a length of less than 250 mm and a width of less than 100 mm.

The filter device 130 includes a carrier element 205, a filter carrier 210, and a drive unit 215. The carrier element 205 is arrangeable in the optical module. The filter carrier 210 is movably arranged on the carrier element 205. Moreover, the filter carrier 210 includes at least one first filter region 220 and one second filter region 225, the filter carrier also includes a third filter region 230 by way of example here. The drive unit 215 is designed to move the filter carrier 210 between a first position, in which the first filter region 220 is arranged in the light path, and a second position, in which the second filter region 225 is arranged in the light path. When the light path is guided, for example, through the first through opening 201, the filter carrier 210 is shown here in the first position.

The drive unit 215 is embodied according to the exemplary embodiment shown here as a belt drive having a toothed belt 235 and an electric motor. The electric motor can be, for example, a stepping motor, also called a stepper motor. By means of the toothed belt 235, it is possible to move the filter carrier 210 rapidly and position it exactly. Further tensioning rollers 237 are used for a taut line of the toothed belt 235.

According to the exemplary embodiment shown here, the filter carrier 210 is embodied as a linearly movable filter slide. The filter carrier 210 movable by means of the drive unit 215 can be moved accordingly along a section of the toothed belt 235, for example, to set the first, the second, or a further position of the filter carrier.

In addition to the filter carrier 210 as a filter slide, the filter device 130 according to the exemplary embodiment shown here includes an optional further filter slide 240. The further filter slide 240 is movably arranged on the carrier element 205. The further filter slide 240 also includes a further first filter region and a further second filter region. In the position shown here of the filter carrier 210 as a filter slide and the further filter slide 240, the further first filter region lies under the first filter region 220 and the further second filter region lies under the second filter region 225. The drive device 215 is designed to move the further filter slide 240 between a further first position, in which the further first filter region is arranged in the light path, and a further second position, in which the further second filter region is arranged in the light path.

Moreover, the filter carrier 210 as a filter slide and the further filter slide 240 according to the exemplary embodiment shown here are arranged lying one over another at least in sections. In addition, the filter slide 210 and the further filter slide 240 are translationally displaceable in relation to one another. In this way, it is possible to displace each one of the filter regions 220, 225, 230 or the further filter regions into the light path. Moreover, it is possible to combine the filter regions 220, 225, 230 with the further filter regions. In this case, both the filter regions 220, 225, 230 and also the further filter regions can be formed according to one exemplary embodiment as optical filters or as an empty position, whereby, for example, a chemoluminescence is also detectable by means of the filter device 130 shown here in the optical module of a lab-on-a-chip analysis device.

According to this exemplary embodiment, the optical module includes the further light path. In the first position of the filter slide 210, the first filter region 220 is arranged in the light path extending through the through opening 201 and the second filter region 225 is arranged in the further light path extending through the further through opening 202. Additionally or alternatively, in the further first position of the further filter slide 240, the further first filter region is arranged in the light path and the further second filter region is arranged in the further light path.

In an assembled state of the filter device 130 and the optical module, it is thus possible to carry out a fluorescence excitation in multiple fluorescent wavelength ranges in one or more regions or chambers of a lab-on-a-chip cartridge received in the optical module, and subsequently to enable a fluorescence detection in multiple fluorescent wavelength ranges over an image region. Filter changes of filters arranged in the filter carrier or the further filter slide 240 are enabled in half of a second on average by means of the drive unit. For this purpose, the filter carrier 210 as a filter slide and the further filter slide 240 are translationally displaced in relation to one another in order to shift in each case a color filter received in one of the filter regions 220, 225, 230 or the further filter regions into an image region in order to enable detection by means of the image sensor of the optical module. At least one color filter and one empty position is contained in each filter slide 210, 240 here. The filter slides 210, 240 are formed according to one exemplary embodiment to slide translationally on ball-bearing-mounted rails. This enables a maintenance-free operation of the filter slides 210, 240 having more than two and a half million filter changes. The position of the filter slides 210, 240 is detected and monitored by means of a sensor. In this way, minimized travel distances of the filter slides 210, 240 are enabled during a sequential movement of all filter elements.

Figure 3:
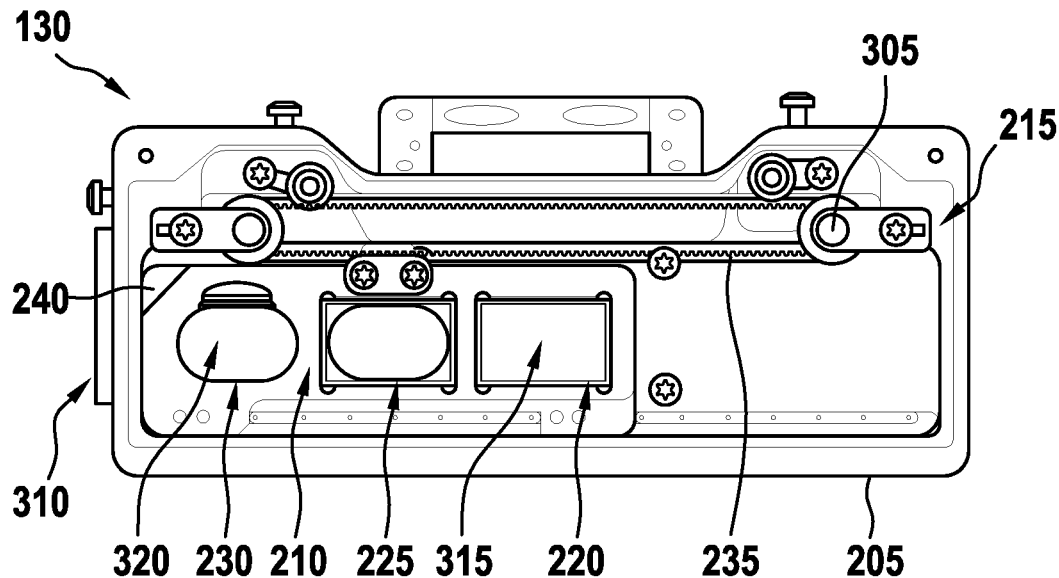

FIG. 3 shows a schematic illustration of a filter device 130 for an optical module for a lab-on-a-chip analysis device according to one exemplary embodiment. A top view of the exemplary embodiment of the filter device shown in FIG. 2 is shown, accordingly the filter carrier 210 is arranged as a linearly movable filter slide on the carrier element 205, and the filter device 130 comprises the further filter slide 240 and the drive unit 215 as a belt drive. According to the exemplary embodiment shown here, the filter slide 210 and the further filter slide 240 are separately driven by the toothed belt 235 having electric motor on a drive roller 305, also called a pulley. The position of the filter slide 210 and of the further filter slide 240 is monitored according to the exemplary embodiment shown here by means of a photoelectric sensor 310. For example, the photoelectric sensor 310 is arranged on a side wall of the carrier element 205, wherein different positions of the filter slides 210, 240 are associated with different distances to the photoelectric sensor 310.

Moreover, the first filter region 220 is formed according to the exemplary embodiment shown here as an optical filter 315 or as an empty position 320. Additionally or alternatively, the second filter region 225 is formed as an optical filter 315 or as an empty position 320. By way of example, the first filter region 220 and the second filter region 225 are formed as optical filters here, and the third filter region 230 is formed as an empty position. To form the empty position 320, for example, a filter opening is left open, and to form one of the filter regions 220, 225, 230 as an optical filter 315, the optical filter 315 is arranged at the filter opening. When the filter slide 210, in a state connected to the optical module, is positioned so that the optical filter 315 arranged in the first filter region 220, for example a color filter, is arranged in the image region, thus in the light path, the further filter slide 240 is thus arranged, for example, so that the empty position 320 lies below the first filter region 220. Thus, if one of the filter slides 210, 240 is positioned on the position of the optical filter 315 as a color filter in the image region, the other filter slide 210, 240 is thus in the position of the empty position. If both filter slides 210, 240 are placed on the empty position and the region to be detected of the lab-on-a-chip cartridge is not illuminated by the excitation light path, a chemoluminescence detection, a self-luminous reaction, can thus be detected. If both filter slides 210, 240 are on the empty position 320 and another excitation wavelength is activated in the excitation path, a check image of the entire image region can thus be recorded.

Figure 4:
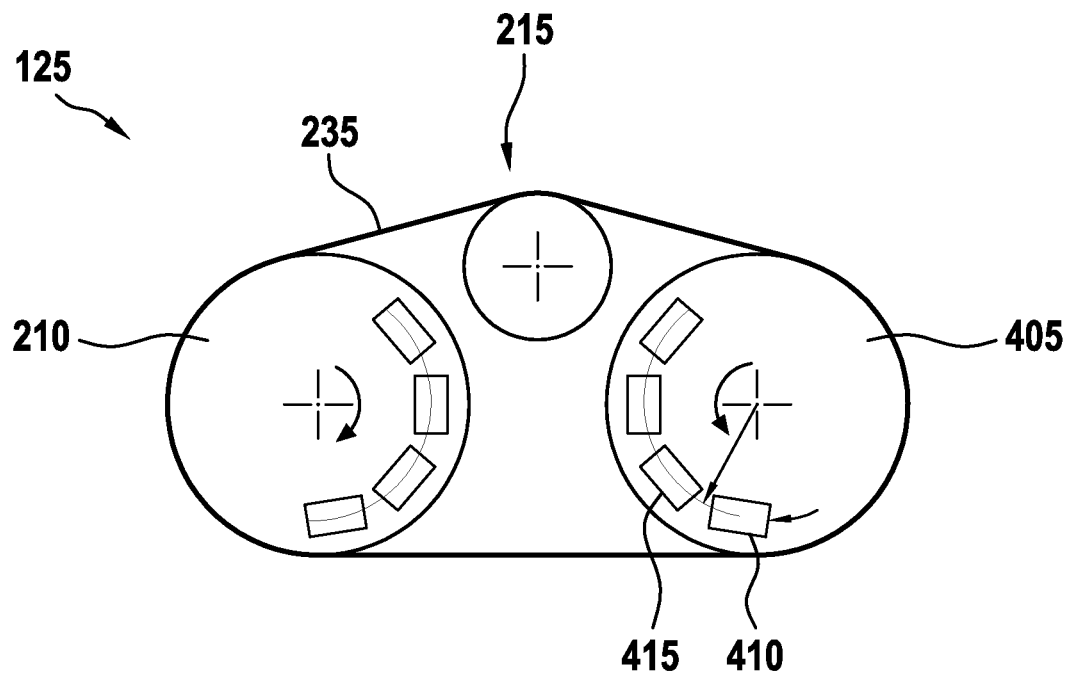

FIG. 4 shows a schematic illustration of a filter device 125 for an optical module for a lab-on-a-chip analysis device according to one exemplary embodiment. The filter device 125 shown here is similar or corresponds to the first filter device described on the basis of FIG. 1. According to the exemplary embodiment shown here, the filter carrier 210 is embodied as a rotatable filter wheel and is also referred to in the following as a filter wheel 210. Moreover, the filter device 125 according to the exemplary embodiment shown here includes an optional further filter wheel 405. The further filter wheel 405 includes a further first filter region 410 and a further second filter region 415. By way of example, the filter wheel 210 and the further filter wheel 405 each include a third and a fourth filter region here. The drive unit 215 is designed to move both the filter wheel 210 and also the further filter wheel 405. The drive unit 215 is thus designed to move the further filter wheel 405 between a further first position, in which the further first filter region 410 is arranged in the further light path, and a further second position, in which the further second filter region 415 is arranged in the further light path.

According to the exemplary embodiment shown here, the filter wheels 210, 405 are arranged adjacent to one another lying in a plane. Moreover, the filter wheel 210 and the further filter wheel 405 are synchronously rotatable by means of the toothed belt 235 of the drive unit 215.

The filter wheel 210 and the further filter wheel 405 each include four filter regions 410, 415 according to the exemplary embodiment shown here, on which optical filters are arranged as excitation filters. Moreover, the filter wheels 210, 405 each also include a black position in order to block the light of the light source as needed, for example, a white-emitting excitation light-emitting diode, for example, to enable a recording of dark images or noise images, or to carry out a chemoluminescence detection.

The embodiment shown here of the filter device 125 advantageously enables a compact construction having a width of, for example, less than 200 mm, with the option of forming five filter regions per filter wheel 210, 405 as shown here. For example, an arrangement of six filter positions per filter wheel 210, 405 with two excitation regions on the lab-on-a-chip cartridge having a diameter of greater than 2 mm diameter is also possible. An arrangement of the filter device 125 shown here having the drive unit 215 in the excitation light path of the optical module advantageously enables a filter change of on average less than half of a second.

Figure 5:
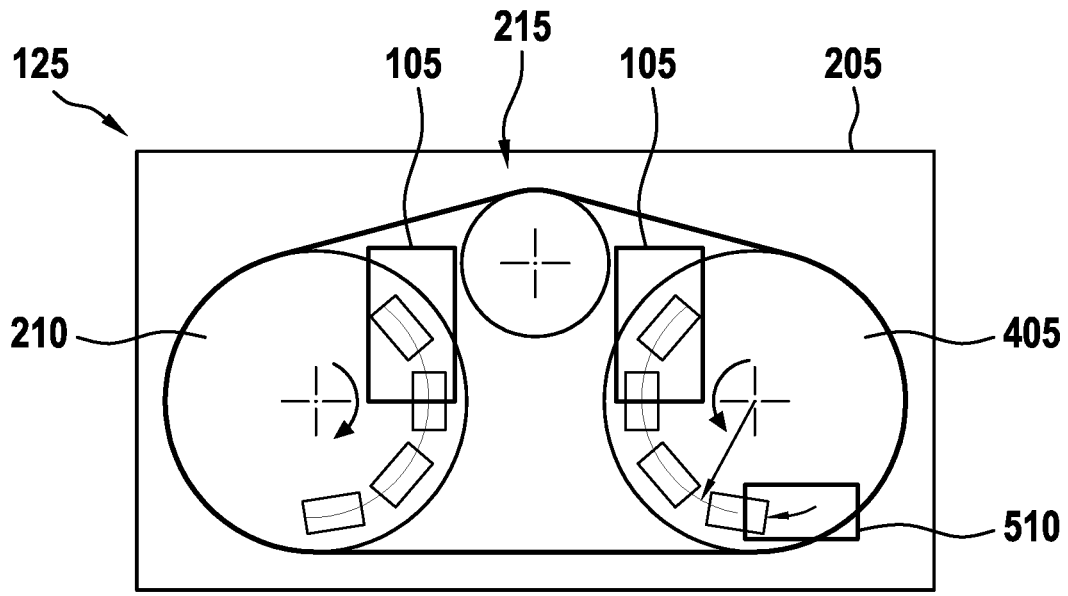
FIG. 5 shows a schematic illustration of an assembly having a filter device for an optical module for a lab-on-a-chip analysis device according to one exemplary embodiment.

FIG. 5 shows a schematic illustration of an assembly having a filter device 125 for an optical module for a lab-on-a-chip analysis device according to one exemplary embodiment. The assembly comprises, in addition to the filter device 125, which is similar or corresponds to the filter device described on the basis of FIG. 4, two light sources 105 in the form of light-emitting diodes arranged on the filter device 125. On a side facing toward the filter device 125, each light source 105 comprises a light guide. The mechanical components of the assembly shown here for the optical module are manufactured, for example, from plastic and aluminum. The components are also black or are anodized black to minimize reflection and penetration of light.

The two light sources 105 are implementable, for example, as white light sources, which are temperature stabilized and are monitored in intensity by means of a check photodiode. To excite multiple regions or chambers of the lab-on-a-chip cartridge, multiple light sources 105 and filter wheels 210, 405 are accordingly arranged adjacent to one another, two each here by way of example. For the rapid filter change, the filter wheels 210, 405 are moved by means of the drive unit 215 in the form of the belt drive. The light of the white light-emitting diodes of the light sources 105 is optionally guided by means of light guides to the filters and the excitation region on the lab-on-a-chip cartridge.

According to the exemplary embodiment shown here, the filter device 125 moreover comprises a sensor 510. The sensor 510 is embodied here by way of example as a photoelectric sensor. Moreover, the sensor 510 is designed to provide a sensor signal representing a positioning of the filter carrier. The sensor signal can be used to control the drive unit 215. Moreover, the filter device 125 comprises the filter carrier 210 embodied as a filter wheel and the further filter wheel 405, which are rotatably arranged on the carrier element 205.

Figure 6:
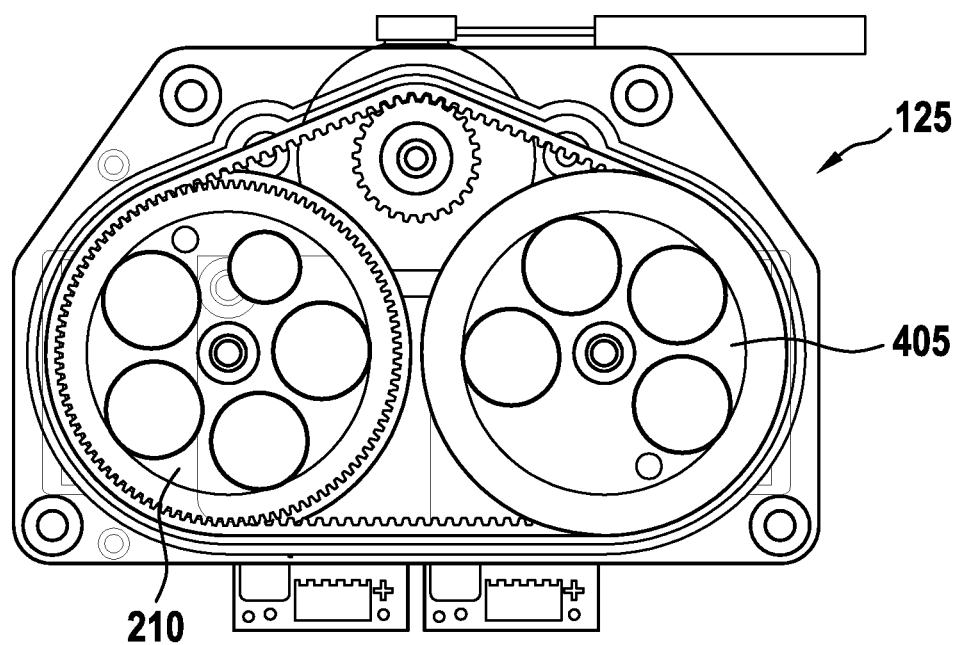
FIG. 6 shows a schematic illustration of a filter device for an optical module for a lab-on-a-chip analysis device according to one exemplary embodiment.

FIG. 6 shows a schematic illustration of a filter device 125 for an optical module for a lab-on-a-chip analysis device according to one exemplary embodiment. The filter device 125 shown here is similar or corresponds to the filter devices described on the basis of FIGS. 4 and 5. The filter carrier 210 as a filter wheel and the further filter wheel 405 each include five filter regions here by way of example, of which one is implemented in each case as a so-called black position for blocking light and four are implemented as optical filters. The optical filters are embodied here, for example, as excitation color filters and are centrally positioned on the filter wheels 210, 405 and permanently adhesively bonded in the filter wheels 210, 405. In this case, the filter regions and thus the color filters in the filter carrier 210 as a filter wheel and the further filter wheel 405 are positioned so that in both fields the same color filter is positioned in each case and two positions can be excited simultaneously on the lab-on-a-chip cartridge. The color filters include, for example, the colors black, gray, red, orange, and blue.

Figure 7:
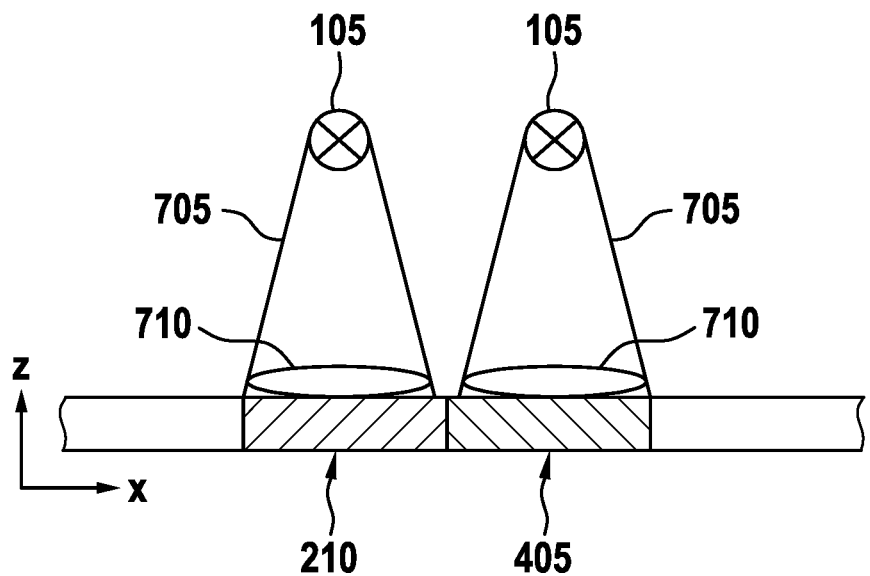
FIG. 7 shows a schematic illustration of a part of an optical module for a lab-on-a-chip analysis device according to one exemplary embodiment.

FIG. 7 shows a schematic illustration of a part of an optical module for a lab-on-a-chip analysis device according to one exemplary embodiment. For example, two light sources 105 are shown as part of the optical module. A light guide 705, which has a conical shape, is arranged on each of the light sources 105. Moreover, two lenses 710 are shown, each of which is arranged on an end of each light guide 705 facing away from the light source 105. The part of the optical module shown here also comprises a portion of the filter carrier 210 as a filter wheel and the further filter wheel 405. The portions of the filter carrier 210 as a filter wheel and the further filter wheel 405 are each arranged at an end of one of the lenses 710 facing away from the light guide 705.

According to the exemplary embodiment shown here, the optical module comprises more than one light source 105. Two light-emitting diodes are arranged in parallel as light sources 105 here by way of example, each having one of the funnel-shaped light guides 705 and one of the lenses 710. The filter wheels 210, 405 are placed so that they communicate with one another by means of gearwheels. A motor gearwheel moves both filter wheels 210, 405 simultaneously, as shown on the basis of following FIG. 8. These subunits are unified downstream of the filter wheels 210, 405 and share the same relay lens. However, the beam paths are positionally resolved by the lens 710 in the funnel of the light guide 705. The subunits are symmetrical to one another, but can also be implemented asymmetrically. The arrangement of the light sources 105 results from the structure and the toothing of the filter wheels 210, 405.

Figure 8:
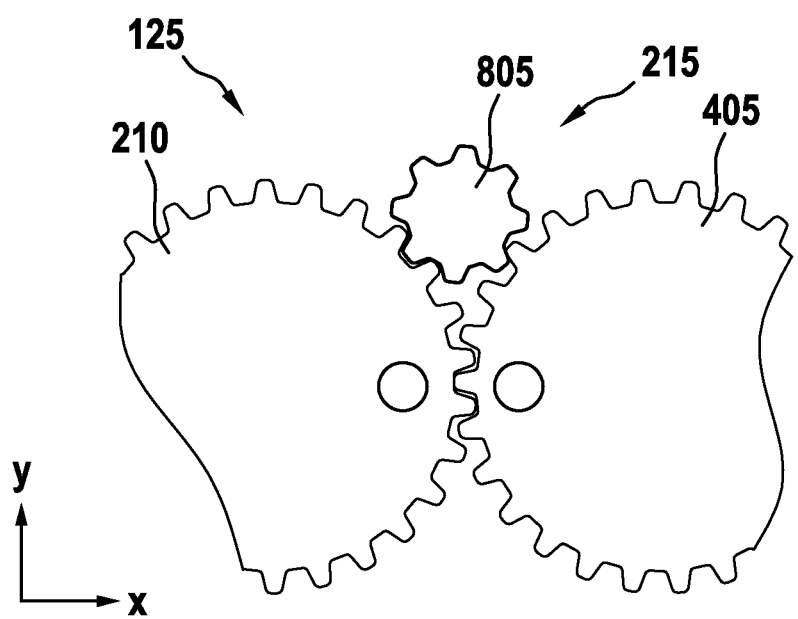
FIG. 8 shows a schematic illustration of a part of a filter device for an optical module for a lab-on-a-chip analysis device according to one exemplary embodiment.

FIG. 8 shows a schematic illustration of a part of a filter device 125 for an optical module for a lab-on-a-chip analysis device according to one exemplary embodiment. The arrangement is shown of the filter carrier 210 as a filter wheel and the further filter wheel 405 from the part of the filter device 125 described on the basis of FIG. 7 for the optical module. The drive unit 215 comprises a motor gearwheel 805 according to the exemplary embodiment shown here. The motor gearwheel 805 is designed to rotate the filter carrier 210 as a filter wheel and the further filter wheel 405 synchronously in order to set the position of the filter regions on the filter carrier 210 and the further filter wheel 405. Teeth of the motor gearwheel 805 engage directly in gear rims of the filter wheels 210, 405. A toothed belt can be omitted in this way.

Figure 9:
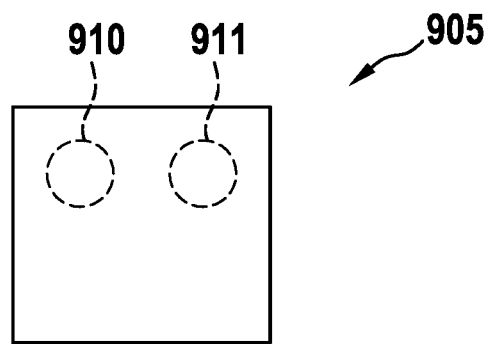
FIG. 9 shows a schematic illustration of a part of an optical module for a lab-on-a-chip analysis device according to one exemplary embodiment.

FIG. 9 shows a schematic illustration of a part of an optical module for a lab-on-a-chip analysis device according to one exemplary embodiment. A total field of view 905 of a camera or the image sensor of the optical module in combination with the macro lens is shown as part of the optical module. By means of an exposure unit, which comprises the light sources which are similar or correspond to the light sources described on the basis of preceding figures, two homogeneous spots 910, 911 are generated. The spots 910, 911 correspond to regions in the lab-on-a-chip cartridge received in the optical module, which are illuminated by means of the light sources 105. The spots 910, 911 have a homogeneous illumination in the spot regions indicated. If a fluorescent mode is used, fluorophores corresponding to the filter are visible there. If one selects an analysis filter, more of the surroundings can be seen due to scattered light and also the entire total field of view 905 can be observed. Moreover, the spots 910, 911 show regions in which quantitative fluorescent measurements are possible. Quantitative absorption measurements are also possible in the region. For incident light images, where location resolution is required, this can be achieved by long exposure times and scattered light. The desired recording region, the field of view to be measured (region of interest [ROI]), can be selected via software. The desired recording region theoretically moves between one pixel and the total field of view 905. The dynamic field of view selection can be used to reduce the amount of data so that the entire field of view 905 does not have to be stored and sent as a data packet. An image can also be constructed via software by a combination of various desired recording regions (ROI) from various recordings.

Figure 10:
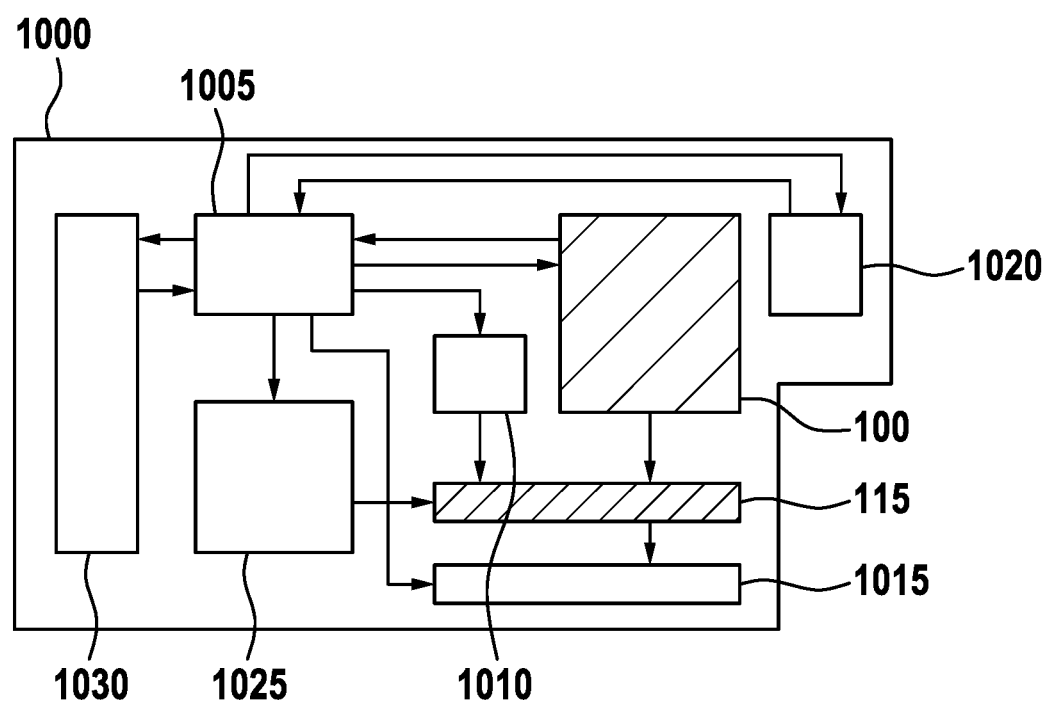
FIG. 10 shows a schematic illustration of a lab-on-a-chip analysis device having an optical module according to one exemplary embodiment.

FIG. 10 shows a schematic illustration of a lab-on-a-chip analysis device 1000 having an optical module 100 according to one exemplary embodiment. A lab-on-a-chip cartridge 115 in the form of a disposable microfluidic unit is arranged in the lab-on-a-chip analysis device 1000. Chemicals and fluidic channels are located on the lab-on-a-chip cartridge 115. Check, conditioning, functional, and detection units are integrated into the lab-on-a-chip analysis device 1000 in the form of permanently defined interfaces, for example, between the optical module 100 and the lab-on-a-chip cartridge 115. A central checking unit 1005 orchestrates all of the other units of the lab-on-a-chip analysis device 1000. For this purpose, the checking unit 1005 is connected so it is capable of signal transmission to the following units of the lab-on-a-chip analysis device 1000: the optical module 100, which is also formed as a central detection unit, an acoustic unit 1010, which can generate or measure soundwaves, a temperature unit 1015, a user interface 1020, a pneumatic unit 1025, and a library 1030 having various pieces of software, for example, an assay-specific evaluation algorithm and a data memory. The checking unit 1005 executes an assay-specific protocol of predefined steps. In this case, the checking unit 1005 activates the corresponding units in a chronologically controlled sequence. The checking unit primarily emits commands. However, it is also possible that the checking unit 1005 receives and evaluates data as a response and then decides about a continuation in the assay protocol and adapts the protocol dynamically.

In addition to a system like the exemplary embodiment shown here of the lab-on-a-chip analysis device 100 having the capacity for processing a microfluidic unit such as the lab-on-a-chip cartridge 115 shown here, it is possible to provide a scaled system having the same architecture and the capacity of processing multiple microfluidic units. In this case, each microfluidic unit can receive its own, structurally-identical optical unit in the form of the optical module 100. Alternatively, the microfluidic units can be arranged so that the optical module 100 is pushed back and forth by means of a motorized xy stage, thus a framework movable in two directions, and images are recorded serially.

Figure 11:
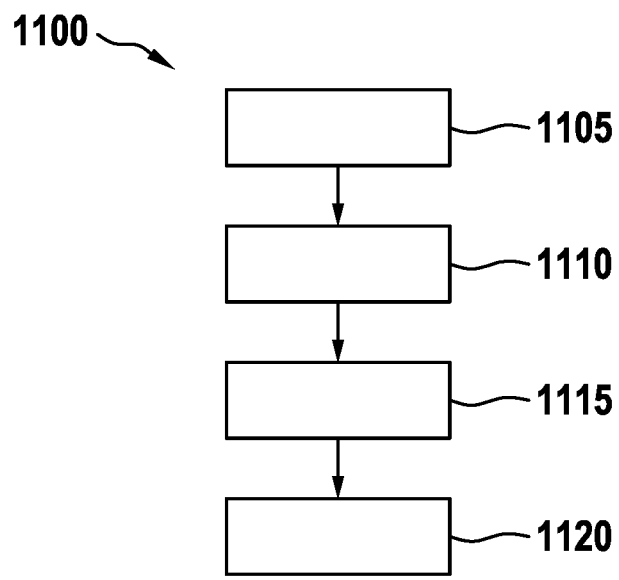
FIG. 11 shows a flow chart of a method for operating an optical module for a lab-on-a-chip analysis device according to one exemplary embodiment.

FIG. 11 shows a flow chart of a method 1100 for operating an optical module for a lab-on-a-chip analysis device according to one exemplary embodiment. The method 1100 shown here is usable to operate an above-described exemplary embodiment of the optical module. The method 1110 comprises a step 1105 of providing a first setting signal, a step 1110 of providing a second setting signal, a step 1115 of providing a first filter change signal, and a step 1120 of providing a second filter change signal. The first setting signal in step 1105 is designed to set the filter carrier of the first filter device in a position associated with an analysis mode. The position associated with the analysis mode can be, for example, the first position or the second position of the filter carrier, as described above on the basis of FIGS. 2 and 3. The second setting signal in step 1110 is designed to set the filter carrier of the second filter device in a position associated with the analysis mode. The first filter change signal in step 1115 is designed to set the filter carrier of the first filter device in a position associated with a further analysis mode. The second filter change signal in step 1120 is designed to set the filter carrier of the second filter device in a position associated with the further analysis mode.

In the following, an exemplary embodiment of the method 1100 and thus an exemplary setting and filter change option of the first and second filter device of the optical module is explained by way of example on the basis of various modes for image recordings: In an analysis mode "blocked", the light path is covered from the direction of the light unit and in the direction of the detection unit, correspondingly the filter carriers of the first filter device, also called a filter LED, and the second filter device, also called a filter camera, are in a "shutter position". The analysis mode "blocked" is used, for example, to measure a noise of a CMOS chip (salt-and-pepper noise). In an analysis mode "incident light", no filter or an analysis filter is placed in front of the LED and camera. Various LED filters can also be received in succession in front of the LED and summed accordingly. In the analysis mode "incident light" an analysis or excitation filter is accordingly arranged in the illuminated filter region of the filter carrier of the first filter device, and an analysis filter or no filter insert is arranged in the illuminated filter region of the filter carrier of the second filter device. The corresponding excitation and emission filters are used for fluorescence. In an analysis mode "fluorescence", an excitation filter is arranged in the corresponding filter region of the first filter device and an emission filter is arranged in the filter region of the second filter device. For a chemoluminescence measurement, the light source is blocked and the analysis filter is used. In an analysis mode "chemoluminescence", a "shutter" is located in the corresponding filter region of the first filter device and an analysis filter or no filter insert is located in the filter region of the second filter device. These modes can be combined with dynamic fields of view (ROI).

Figure 12:
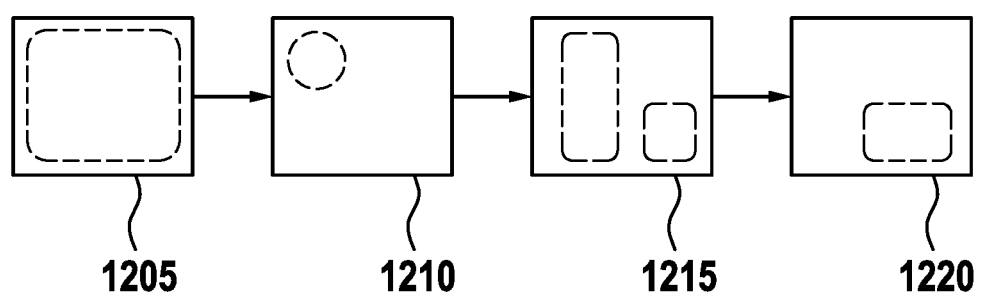
FIG. 12 shows a schematic illustration of a use of an optical module for a lab-on-a-chip analysis device according to one exemplary embodiment.

FIG. 12 shows a schematic illustration of a use of an optical module for a lab-on-a-chip analysis device according to one exemplary embodiment. Combinations of various recording modes with various fields of view are shown in a sequence of the method. The first recording mode 1205 shows a total field of view by way of example. In this case, for example, a location of the microfluidic unit, thus the lab-on-a-chip cartridge, can be checked. A relative coordinate system for the lab-on-a-chip cartridge can be placed using this information. This is of interest since any lab-on-a-chip cartridge can be located slightly displaced in the analysis unit, the lab-on-a-chip analysis device, due to manufacturing and mechanical conditions. This information has to be measured once and ROI for following recordings using the same lab-on-a-chip cartridge can be dynamically adapted. One can also establish using such an image whether fluids are present in microfluidic channels. A second recording mode 1210 shows how an assay result can be read out by fluorescence. In a next step, when the first measurement method of the first part is completed and the sample is further processed, it can be checked by image recording in the transmitted light mode, as shown on the basis of a third recording mode 1215, whether the transition from the first method into the second has taken place successfully or whether, for example, air has entered the system or thorough mixing has not taken place. In the next step, the second method can be recorded using another recording mode, a fourth recording mode 1220 shown here. In all steps, various filter positions and fields of view can be recorded using the same optical unit, the optical module. As an example, an assay is executed here in which, in a first step, sample material is purified, an amplification takes place by means of PCR, and the specificity of the PCR products is detected by means of a DNA micro-array. In addition to the universal location image, it can also be measured again and again in the bright field whether bubbles are in the analyte. A PCR can then be tracked by means of fluorescence. For example, in real time or also using a starting point and endpoint measurement. The micro-array can then be read out by means of chemoluminescence. Microarrays, which are often spatially separated from PCR reaction vessels, can thus be arranged easily according to the described arrangement of the analysis unit system on a lab-on-a-chip cartridge and connected by means of channels.

Figure 13:
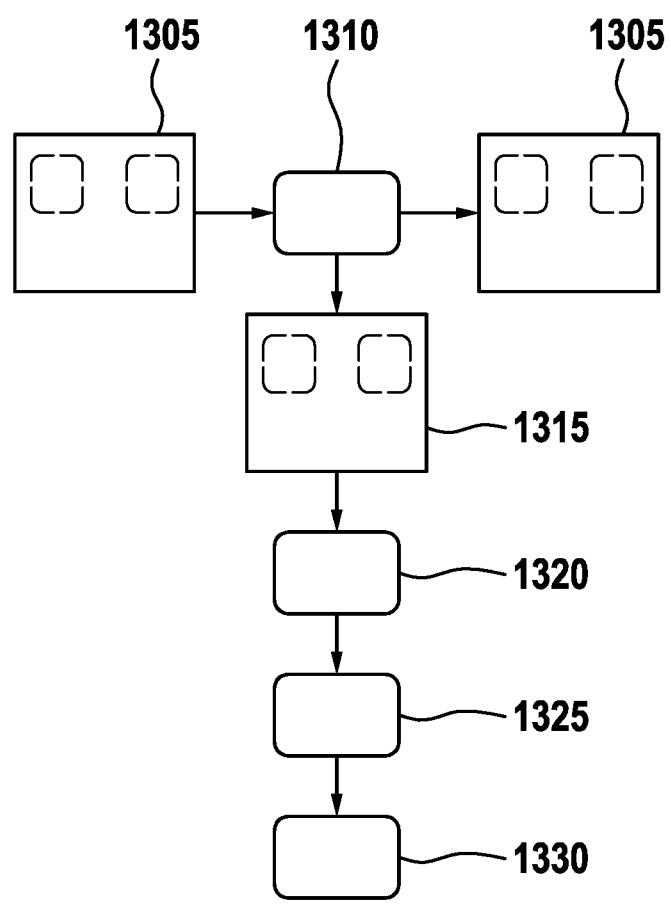
FIG. 13 shows a schematic illustration of a use of a lab-on-a-chip analysis device having an optical module according to one exemplary embodiment.

FIG. 13 shows a schematic illustration of a use of a lab-on-a-chip analysis device having an optical module according to one exemplary embodiment. For example, a lab-on-a-chip analysis device is used as described on the basis of FIG. 10. As an example, a use of the lab-on-a-chip analysis device for a dynamic progress check of an LoC assay is shown here. For this purpose, recording is carried out in a recording mode 1305 shown here. Subsequently, an evaluation is carried out as marked here by a first block 1310. If a quantitative measurement, for example a fluorescence measurement, is performed, the result is then evaluated in situ. If the signal corresponds to typical values of the assay, the experimental sequence or the measurement is thus continued, correspondingly the recording mode 1305 is also still executed. If an anomaly is established in the measured value, the measurement field is thus measured in another analysis mode 1315, for example incident light instead of fluorescence, to analyze what has resulted in the anomaly. A deviation measurement and a comparison to known anomalies take place, marked here by a second block 1320. The deviation measurement is compared here to a library of possible errors. In each assay, there are various reasons for occurrence for an anomaly. These can be checked and analyzed using various recording modes. The error analysis can then be compared to the library and a corresponding error message can be returned, marked here by a third block 1325 "error code". If the error is not noted in the library, it can also be sent back via communication interfaces to a platform provider, analyzed, and received as a new element in the library. The method is subsequently continued according to instructions from the library corresponding to the error message, which is marked here by a fourth block 1330.

If an exemplary embodiment comprises an "and/or" linkage between a first feature and a second feature, this is thus to be read to mean that the exemplary embodiment includes both the first feature and also the second feature according to one embodiment and includes either only the first feature or only the second feature according to a further embodiment.

The invention claimed is:

1. An optical module for a lab-on-a-chip analysis device, the optical module comprising:
   a light source;
   a receptacle region configured to receive a lab-on-a-chip cartridge;
   an image sensor;
   a first filter device arranged in an excitation light path between the light source and the receptacle region, the first filter device comprising:
   a first carrier element;

a first filter carrier movably arranged on the first carrier element, the first filter carrier having a first filter region and a second filter region; and a first drive unit configured to move the first filter carrier between a first position, in which the first filter region is arranged in the excitation light path, and a second position, in which the second filter region is arranged in the excitation light path; and a second filter device arranged in a detection light path between the receptacle region and the image sensor, the second filter device comprising:

a second carrier element;

a second filter carrier movably arranged on the second carrier element, the second filter carrier having a third filter region and a fourth filter region; and a second drive unit configured to move the second filter carrier between a third position, in which the third filter region is arranged in the detection light path, and a fourth position, in which the fourth filter region is arranged in the detection light path.

2. The optical module as claimed in claim 1, wherein at least one of the first, second, third, and fourth filter regions is formed as an optical filter or as an empty position.

3. The optical module as claimed in claim 1, wherein at least one of the first and second drive units includes a belt drive having a toothed belt and an electric motor.

4. The optical module as claimed in claim 1, wherein at least one of the first and second filter devices further comprises a sensor configured to provide a sensor signal representing a positioning of the respective first or second filter carrier.

5. The optical module as claimed in claim 1, wherein at least one of the first and second filter carriers includes a linearly movable filter slide or a rotatable filter wheel.

6. The optical module as claimed in claim 1, wherein:
the second filter carrier includes a linearly movable first filter slide;
the second filter device further comprises a second filter slide movably arranged on the second carrier element, the second filter slide including a further first filter region and a further second filter region; and
the second drive unit is configured to move the second filter slide between a further first position, in which the further first filter region is arranged in the detection light path, and a further second position, in which the further second filter region is arranged in the detection light path.

7. The optical module as claimed in claim 6, further comprising:
a further detection light path, and
wherein (i) in the third position of the first filter slide, the third filter region is arranged in the detection light path and the fourth filter region is arranged in the further detection light path and/or (ii) in the further first position of the second filter slide, the further first filter region is arranged in the detection light path and the further second filter region is arranged in the further detection light path.

8. The optical module as claimed in claim 6, wherein the first filter slide and the second filter slide are situated lying one over another at least in sections and/or are translationally displaceable in relation to one another.

9. The optical module as claimed in claim 6, wherein the first filter slide and the second filter slide are arranged lying at least partially one over another and are translationally displaceable in relation to one another.

10. The optical module as claimed in claim 9, wherein the first filter slide and the second filter slide are arranged, in at least one position, such that the further first filter region lies under the third filter region, and the further second filter region lies under the fourth filter region.

11. The optical module as claimed in claim 1, wherein further comprising:
a further excitation light path,
wherein:
the first filter carrier includes a first filter wheel;
the first filter device further comprises a second filter wheel rotatably arranged on the first carrier element, the second filter wheel including a further first filter region and a further second filter region; and
the first drive unit is configured to move the second filter wheel between a further first position, in which the further first filter region is arranged in the further excitation light path, and a further second position, in which the further second filter region is arranged in the further excitation light path.

12. The optical module as claimed in claim 11, wherein the first and second filter wheels are arranged located adjacent to one another and are synchronously rotatable.

13. The optical module as claimed in claim 1, wherein at least one of the first and second filter carriers further comprises a fifth filter region.

14. A method for operating an optical module for a lab-on-a-chip analysis device, the optical module including (i) a light source; (ii) a receptacle region configured to receive a lab-on-a-chip cartridge; (iii) an image sensor; (iv) a first filter device in an excitation light path between the light source and the receptacle region; and (v) a second filter device arranged in a detection light path between the receptacle region and the image sensor, each of the first and second filter devices including (a) a carrier element, (b) a filter carrier movably arranged on the carrier element, the first filter carrier having a first filter region and a second filter region, and (c) a drive unit configured to move the filter carrier between a first position, in which the first filter region is arranged in the respective excitation or detection light path, and a second position, in which the second filter region is arranged in the respective excitation or detection light path the method comprising:
providing a first setting signal, which is configured to set the filter carrier of the first filter device in a first position associated with a first analysis mode;
providing a second setting signal, which is configured to set the filter carrier of the second filter device in a second position associated with the first analysis mode;
providing a first filter change signal, which is configured to set the filter carrier of the first filter device in a third position associated with a second analysis mode; and
providing a second filter change signal, which is configured to set the filter carrier of the second filter device in a fourth position associated with the second analysis mode.

* * * * *